Patented Dec. 30, 1941

2,268,501

UNITED STATES PATENT OFFICE 2,268,501

VULCANIZATION OF RUBBER

Theodore F. Bradley, Stamford, Conn., assignor to American Cyanamid Company, New York, N. Y., a corporation of Maine No Drawing. Application January 25, 1940, Serial No. 315,533

10 Claims. (Cl. 260—759)

This invention relates to vulcanization of rubber and more particularly to the control of the activity of accelerators employed in the vulcanization.

It is known to use sulfur-bearing materials such as mercapto-benzothiazole, benzothiazyl disulfide and the like as accelerators of the vulcanization of rubber. These and other accelerators which come within the classification of compounds containing sulfur and which are acidic or which hydrolyze to produce mercaptans or thio acids have been recognized, in general, to become more active in the presence of certain basic substances. Among the substances which may be used for this purpose are the diaryl guanidines, such, for example, as diphenyl guanidine, di-ortho-tolyl guanidine, phenyl-ortho-tolyl guanidine and the like. However, these latter substances are apt to cause set-up or "scorching" in the rubber during the preliminary processing such as milling, calendering, extruding, etc., prior to the desired vulcanizing of the rubber, and they may even cause premature vulcanization of the rubber during storage.

It is an object of the invention therefore to produce an activator for a sulfur-bearing accelerator which has a slower rate of set-up than the diaryl guanidines such as diphenyl guanidine, for example.

This and other objects are attained by preparing a delayed action activator by heating to fusion a diaryl guanidine and a diterpenemaleic anhydride addition product or adduct. The adduct which is a dibasic acid anhydride or a mixture of isomeric dibasic acid anhydrides may be hydrolyzed in known manner to obtain the dibasic acid or acids which may be employed in place of the adduct. In the specification and claims it is intended that the term addition product or adduct include also the free dibasic acid or acids.

The diterpene-maleic anhydride addition products or adducts may be prepared by heating a diterpene of the formula $C_{20}H_{32}$ with maleic anhydride or its equivalent of maleic acid and purifying the resinous product by distillation to remove unreacted materials and traces of low molecular weight impurities. Water-soluble materials in the resinous residue such as unreacted maleic anhydride may be extracted with water. Such a process of preparing the addition products or adducts is more particularly described in my application, Serial Number 51,498 filed Nov. 25, 1935, now Patent No. 2,208,321.

The non-volatile resinous residue obtainable in accordance with the above process consists essentially of dibasic acid anhydrides of unsaturated nature. Chemically, these anhydrides are probably a mixture of isomers having the formula $C_{42}H_{34}O_3$ and a molecular weight of 370.

The preparation of the delayed action activators of the present invention is carried out by heating to fusion a diterpene-maleic anhydride addition product or adduct and a diaryl guanidine such as di-ortho-tolyl guanidine, for example, with or without the presence of a dispersing agent.

In their preferred form, the activators of the present invention are made by fusing the ingredients in the presence of a dispersing agent such as the inert asphalt base hydrocarbon oil known in the art as medium-process oil, or in place of the oil other suitable organic dispersing agents such as stearic acid may be employed. By the term inert hydrocarbon oil as used herein is meant a hydrocarbon oil which when used in amounts sufficient to obtain good dispersion of the activator, in which role it is essentially an anti-tack for preventing balling of the activator on the rolls during milling, has no appreciable effect on the chemistry involved in the vulcanization of the rubber. Where the dispersing agent is omitted in the heating to fusion of the diaryl guanidine and the adduct a small amount of the agent is added in the subsequent compounding to obtain good dispersion of the activator in the rubber mix.

The invention will be illustrated by the following example to which, however, the invention is not to be limited. Unless otherwise specified, proportions are given as parts by weight.

Example

A delayed action activator of the preferred type was prepared as follows. 62 parts of di-ortho-tolyl guanidine (2 mols.), 48 parts of diterpene-maleic anhydride adduct (1 mol.), and 15 parts of medium-process oil (asphalt base) were heated together. In five minutes the mass temperature was 101° C. and the material was completely melted. The temperature was held between 90° and 100° C. for an additional five minutes. The homogeneous resin-like product was easily powdered and had a softening point below 90° C.

Samples were then compounded to contain this product activator and di-ortho-tolyl guanidine alone in equivalent amount as follows.

|  | Compounds | |
| --- | --- | --- |
|  | A | B |
| Smoked sheets | 100 | 100 |
| Zinc oxide | 6 | 6 |
| Sulfur | 3 | 3 |
| Benzothiazyl disulfide | .75 | .75 |
| Product activator | .625 |  |
| Di-ortho-tolyl guanidine |  | .31 |

The samples were then tested for set-up values in a Williams plastometer using a five minute "y"

value at 70° C. The lower the per cent change in the "y" value the less the set-up or tendency of the material to cause "scorching" in the rubber.

|  | Compounds | |
|---|---|---|
|  | A | B |
| No heat_____inch__ | .072 | .076 |
| After heating 1.5 hours in water at 85° C___do__ | .073 | .085 |
| Change_____percent__ | +1.4 | +12 |
| After heating 2 hours in water at 85° C____inch__ | .085 | .150 |
| Change_____percent__ | +18 | +97.4 |

It is apparent from the above results that the activator product showed much less tendency to pre-vulcanization or scorching than the di-ortho-tolyl guanidine alone.

The samples were then tested at full cure with the following results.

| 25 minute cure at 130° C. | Compounds | |
|---|---|---|
|  | A | B |
| Stress—lbs./sq. in. at 500%_____ | 1,450 | 1,580 |
| Tensile—lbs./sq. in. at 500%_____ | 3,930 | 4,130 |
| Elongation, percent_____ | 650 | 650 |

These results show the product activator to give physical properties similar to those obtained with the free or unretarded di-ortho-tolyl guanidine.

It is an advantage of the present invention that when the diaryl guanidine and the adduct are heated to fusion in the presence of an organic dispersing agent, such as medium-process oil, a homogeneous resin-like product is obtained which has a relatively low softening point and therefore is easily fluxed in the rubber. In this respect my products will give better dispersion than the usual delayed action activators, such as the phthalate and oxalate salts of diphenyl guanidine for example, which are crystalline materials with high melting points and not readily dispersible in the rubber.

The delayed action activators of the present invention may be used to activate any sulfur-bearing accelerator which is activated by a basic material such as the diaryl guanidines. The particular delayed action activator used and the amount thereof employed in the rubber mix will depend, as will be recognized by those skilled in the art, on the characteristics of the sulfur-bearing accelerator employed.

Any of the diaryl guanidines, further examples of which are diphenyl guanidine and phenyl-ortho-tolyl guanidine, may be combined in varying proportions with the adducts to form delayed action activators of the present invention.

The organic dispersing agent, which is employed in suitable amount for the dispersion of the activator, may be introduced into the rubber mix in the combined form as part of the delayed action activator or it may be added separately thereto in the compounding. Organic materials suitable as dispersing agents are, for example, medium-process oil (asphalt base), petroleum oil, petrolatum, paraffin wax, stearic acid, mixed fatty acids, degras, palm oil, lauric acid, cottonseed oil, cottonseed oil fatty acids, zinc stearate, zinc laurate; or other suitable oils or waxes of mineral, animal or vegetable origin may be employed.

The foregoing description of the invention is intended by way of illustration and not by way of limitation thereof, the scope of which is defined in the appended claims.

What I claim is:

1. The process which comprises vulcanizing rubber containing a sulfur-bearing accelerator and the product produced by heating to fusion a diaryl guanidine and a diterpene-maleic anhydride addition product.

2. The process which comprises vulcanizing rubber containing a sulfur-bearing accelerator and the product produced by heating to fusion di-ortho-tolyl guanidine and a diterpene-maleic anhydride addition product.

3. The process which comprises vulcanizing rubber containing a sulfur-bearing accelerator and the product produced by heating to fusion a diaryl guanidine, a diterpene-maleic anhydride addition product, and an organic dispersing agent.

4. The process which comprises vulcanizing rubber containing a sulfur-bearing accelerator and the product produced by heating to fusion di-ortho-tolyl guanidine, a diterpene-maleic anhydride addition product, and an organic dispersing agent.

5. The process which comprises vulcanizing rubber containing a sulfur-bearing accelerator and the product produced by heating to fusion di-ortho-tolyl guanidine, a diterpene-maleic anhydride addition product, and an inert hydrocarbon oil.

6. A vulcanizable rubber mix having incorporated therein a sulfur-bearing accelerator and the product produced by heating to fusion a diaryl guanidine and a diterpene-maleic anhydride addition product.

7. A vulcanizable rubber mix having incorporated therein a sulfur-bearing accelerator and the product produced by heating to fusion di-ortho-tolyl guanidine and a diterpene-maleic anhydride addition product.

8. A vulcanizable rubber mix having incorporated therein a sulfur-bearing accelerator and the product produced by heating to fusion a diaryl guanidine, a diterpene-maleic anhydride addition product, and an organic dispersing agent.

9. A vulcanizable rubber mix having incorporated therein a sulfur-bearing accelerator and the product produced by heating to fusion di-ortho-tolyl guanidine, a diterpene-maleic anhydride addition product, and an organic dispersing agent.

10. A vulcanizable rubber mix having incorporated therein a sulfur-bearing accelerator and the product produced by heating to fusion di-ortho-tolyl guanidine, a diterpene-maleic anhydride addition product and an inert hydrocarbon oil.

THEODORE F. BRADLEY.